(12) United States Patent
Patton

(10) Patent No.: US 7,852,914 B2
(45) Date of Patent: Dec. 14, 2010

(54) FADE EQUALIZER

(75) Inventor: Eddie Patton, Bothell, WA (US)

(73) Assignee: Broadcom Corporation, Irvine, CA (US)

( * ) Notice: Subject to any disclaimer, the term of this patent is extended or adjusted under 35 U.S.C. 154(b) by 872 days.

(21) Appl. No.: 11/643,738

(22) Filed: Dec. 20, 2006

(65) Prior Publication Data

US 2008/0151986 A1   Jun. 26, 2008

(51) Int. Cl.
*H03H 7/40* (2006.01)

(52) U.S. Cl. ............... 375/230; 375/232; 708/323

(58) Field of Classification Search ........... 375/229, 375/230, 232, 233, 350; 708/300, 301, 322, 708/323
See application file for complete search history.

(56) References Cited

U.S. PATENT DOCUMENTS

| 4,390,749 A | * | 6/1983 | Pearson | ............... 381/10 |
| 5,367,536 A |  | 11/1994 | Tsujimoto |  |
| 6,246,732 B1 |  | 6/2001 | Kobayashi et al. |  |
| 7,027,503 B2 | * | 4/2006 | Smee et al. | ............... 375/233 |
| 2003/0118094 A1 | * | 6/2003 | Wang et al. | ............... 375/231 |
| 2004/0037354 A1 | * | 2/2004 | Jayaraman et al. | ............ 375/229 |
| 2006/0274866 A1 | * | 12/2006 | Chang | ............... 375/346 |
| 2008/0260014 A1 | * | 10/2008 | Yang et al. | ............... 375/232 |

FOREIGN PATENT DOCUMENTS

| GB | 2078470 | 1/1982 |
| GB | 2242597 | 10/1991 |

* cited by examiner

*Primary Examiner*—Dac V Ha
(74) *Attorney, Agent, or Firm*—McAndrews, Held & Malloy, Ltd.

(57) ABSTRACT

Processing a received signal is disclosed. It is determined that a received signal does not satisfy a prescribed signal quality criterion. Based at least in part on the determination, an equalizer tap is not updated based on the received signal.

34 Claims, 4 Drawing Sheets

FADE EQUALIZER

BACKGROUND OF THE INVENTION

Equalizers that utilize channel estimation (e.g., Decision Feedback Equalizers) have been used in wireless receivers to compensate for distortions (e.g., inter-symbol interference and multi-path effects) of a wireless channel. The equalizer can be used to correct amplitude, phase, and/or delay of a distorted signal. For example in mobile communication, a training sequence code (TSC) is sent with each burst of data, and the training sequence code is used to estimate the channel for the burst. Using the channel estimation, taps of the equalizer are updated. Traditionally, equalizer taps are updated every time a TSC included with a burst of data is detected. In some environments, a transmitted signal can be subject to long lasting fades. These fades can push the desired signal low enough that co-channel and adjacent channel noise become dominant and cause incorrect channel estimation. When the incorrect channel estimation is used to update the equalizer taps, the equalizer does not function as desired. For example, the equalizer with undesirable tap values no longer equalizes the received signal as desired. Therefore there exists need for a better way to update equalizer taps.

BRIEF DESCRIPTION OF THE DRAWINGS

Various embodiments of the invention are disclosed in the following detailed description and the accompanying drawings.

DETAILED DESCRIPTION

Figure 1:
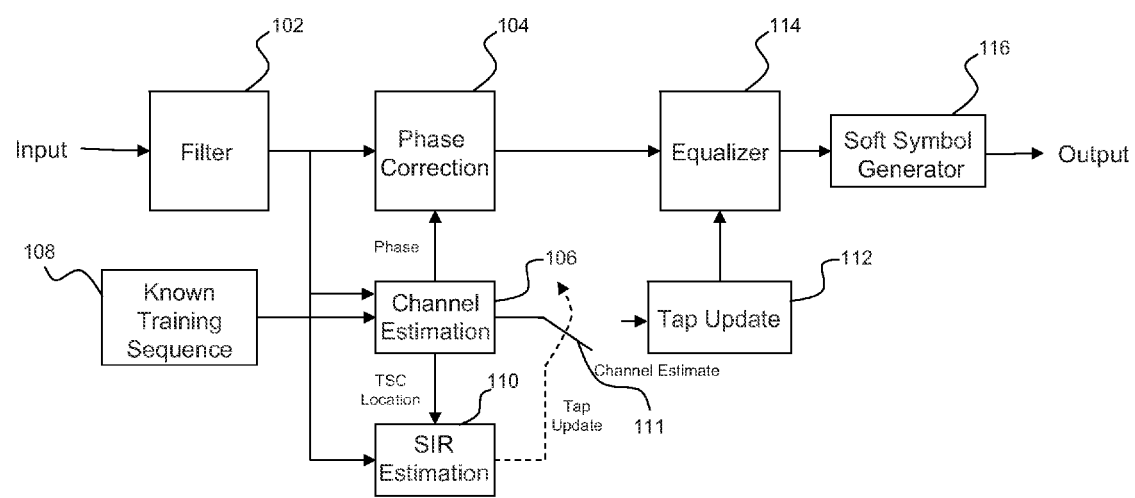
FIG. 1 is a block diagram illustrating an embodiment of a system for equalization.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically determining whether to allow one or more equalizer taps to be updated is disclosed. The equalizer taps are associated with an equalizer that utilizes channel estimation. In some embodiments, the equalizer tap is an equalizer tap of one or more of the following: a Decision Feedback Equalizer (DFE), a Maximum Likelihood Sequence Estimator (MLSE) Equalizer, a Delayed Decision Feedback Sequence Estimator (DDFSE) Equalizer, and a Reduced State Sequence Estimator (RSSE) Equalizer.

In some embodiments, if a received signal does not satisfy a prescribed signal quality criterion, one or more equalizer taps are not updated based on data channel estimation performed using the received signal. For example, in an environment where channel distortions are not likely to change drastically between bursts (e.g., indoor environment), channel estimations for signal amplitude and delay are also not likely change drastically between bursts. If a channel estimation cannot be reliably determined for a TSC included in a burst, a previous tap value determined using a previous reliable channel estimation is likely to yield better equalization than a tap value determined using a unreliable channel estimation. In some embodiments, phase correction is performed using a received TSC even if the received TSC is not used in updating equalizer taps for amplitude and/or phase equalization. For example, phase correction is performed on the received signal using the TSC before the signal is provided to an equalizer.

FIG. 1 is a block diagram illustrating an embodiment of a system for equalization. In some embodiments, the system of FIG. 1 is included in a wireless receiver (e.g., receiver included in a Base Transceiver Station of a wireless network). An input signal is filtered by filter module 102. Filter module 102 includes one or more of the following types of filters: a low pass filter, a high pass filter, and a band pass filter. The filtered signal is provided to phase correction module 104, channel estimation module 106, and SIR (signal-to-interference ratio) estimation module 110. Channel estimation module 106 estimates the desired channel of the input signal at least in part by determining a TSC included in the input signal. When the TSC is detected, the TSC is compared with known training sequence 108 to estimate the channel. In some embodiments, channel estimation of module 106 includes determining information that can be used to adjust the phase of the input signal, identify the location of the TSC within the input signal, and information that can be used to update one or more taps of equalizer 114. In various embodiments, equalizer 114 includes one or more of the following: a Decision Feedback Equalizer (DFE), a Maximum Likelihood Sequence Estimator (MLSE) Equalizer, a Delayed Decision Feedback Sequence Estimator (DDFSE) Equalizer, and a Reduced State Sequence Estimator (RSSE) Equalizer. Phase correction module 104 uses the determined phase information of module 106 to correct the phase of the input signal and provide the phase corrected signal to equalizer 114. In some embodiments, the phase correction is performed for every TSC instance detected by module 106.

The TSC location information of module 106 is provided to SIR estimation module 110. SIR estimation module 110 determines whether the input signal satisfies a prescribed signal quality criterion. For example, the signal-to-interference ratio of the input signal at a location corresponding to the TSC identified by module 106 is used to determine whether a channel estimation that is sufficiently reliable to be used to update the equalizer taps can be determined. If the signal to interference ratio is greater-than or greater-than-or-equal-to a prescribed value, the equalizer tap update information of module 106 is provided to tap update module 112. If the signal to interference ratio is less-than or less-than-or-equal-to the prescribed value, the equalizer tap update information of module 106 is not provided to tap update module 112, and the equalizer taps are not updated using the information of module 106. In some embodiments, one or more additional and/or other criteria are used in determining whether to provide channel estimate information to module 112. For example, signal-to-noise ratio is used. Switch 111 allows channel estimate information of module 106 to be selectively provided to tap update module 112, and switch 111 is controlled at least in part by a determination made using SIR estimation module 110. In some embodiments, switch 111 is not a separate and/or physical device and instead comprises a logic of the channel estimation module 106 and/or some other component, whereby channel estimation information is only sent to tap update module 112 if the signal-to-noise ratio and/or other criteria is/are satisfied. Tap update module 112 uses the provided information of module 106 to update one or more taps of equalizer 114. In some embodiments, updating the taps includes determining one or more tap values/coefficients. In some embodiments, the tap values/coefficients are associated with signal amplitude and/or delay equalization/correction. In some embodiments, the updated taps include one or more feed-forward and/or feed-back taps (e.g. DFE taps) of equalizer 114. Soft symbol generation module 116 generates soft symbols at least in part by using the output of equalizer 114.

Figure 2:
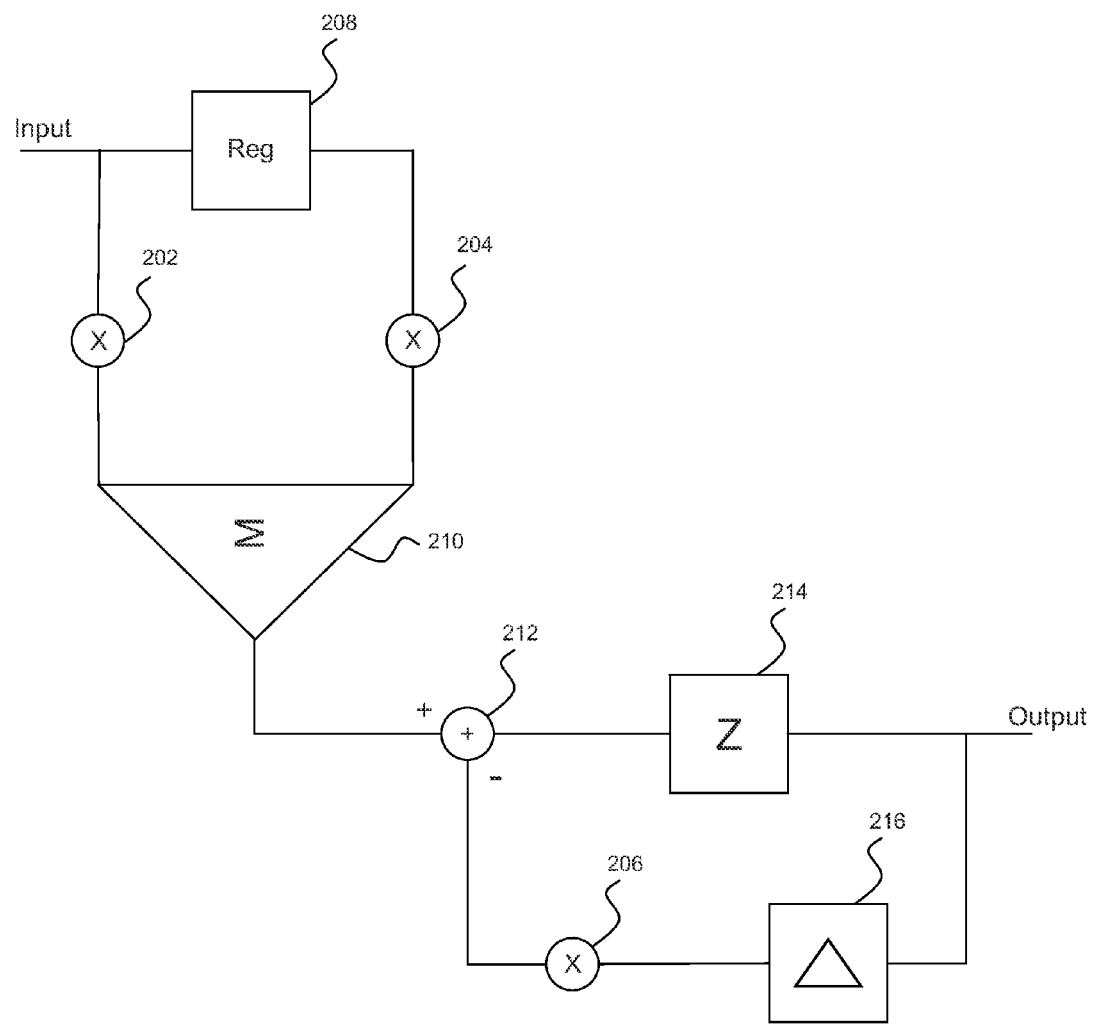
FIG. 2 is a block diagram illustrating an embodiment of a Decision Feedback Equalizer (DFE).

FIG. 2 is a block diagram illustrating an embodiment of a Decision Feedback Equalizer (DFE). In some embodiments, DFE 200 is included in equalizer 114 of FIG. 1. DFE 200 is merely an example. In the example shown, two feed-forward taps 202 and 204 and one feed-back tap 206 are shown. Any number of feed-forward and feed-back taps may exist in other embodiments. In some embodiments, the DFE includes eight feed-forward taps and two feed-back taps. Updating one or more taps of DFE 200 includes adjusting a value/coefficient associated with the taps and/or adjusting formula/logic associated with the taps. An input signal is shifted through register 208. The input signal processed by the taps 202 and 204 are processed by convolution module 210. Addition module 212 processes the output of convolution module 210 and a feed-back signal adjusted by feed-back tap 206 to provide an input to decision module 214. Output of decision module 214 is provided as the equalized output and the output of decision module 214 is provided to delay module 216 in a feed-back path. The output of delay module 216 is provided to feed-back tap 206.

Figure 3:
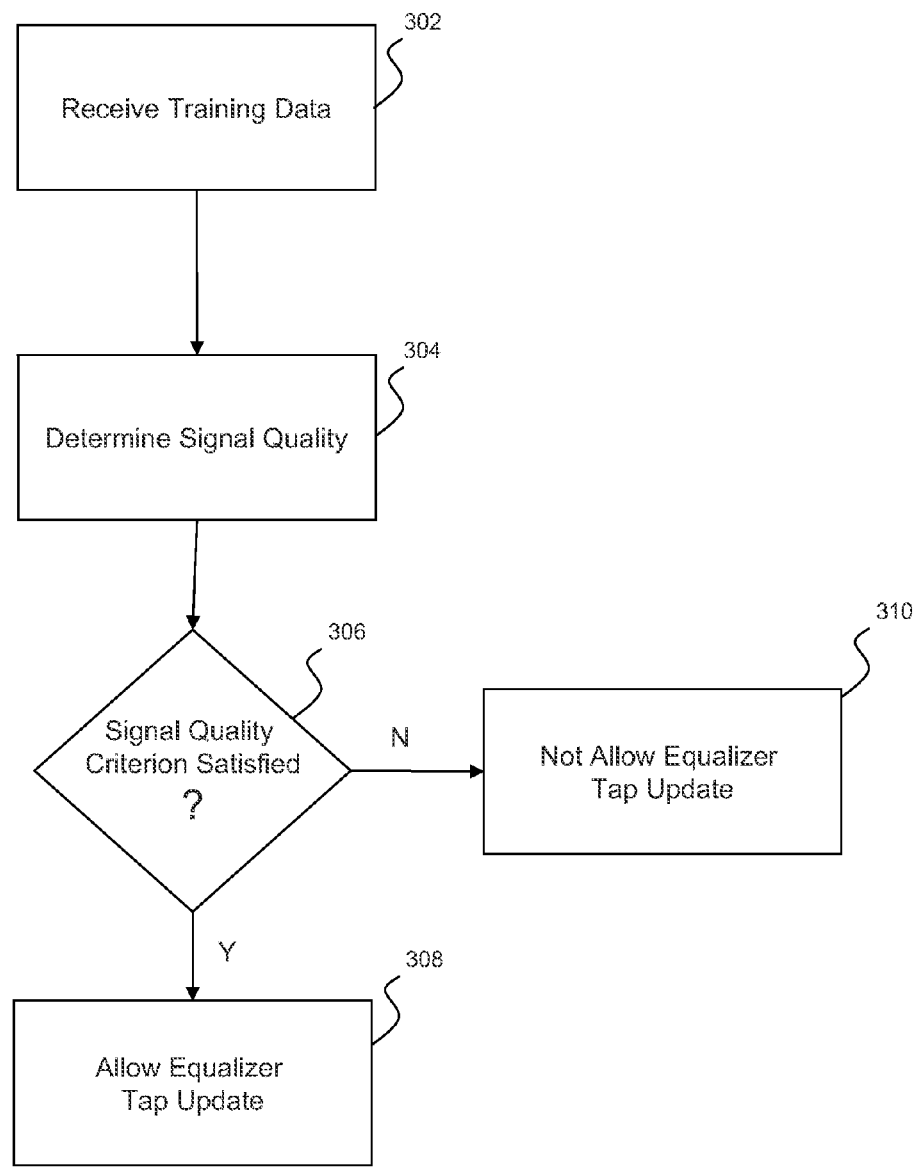
FIG. 3 is a flowchart illustrating an embodiment of a process for determining whether to allow equalizer tap update.

FIG. 3 is a flowchart illustrating an embodiment of a process for determining whether to allow equalizer tap update. In some embodiments, at least a portion of the process of FIG. 3 is implemented on channel estimation 106 and SIR estimation module 110 of FIG. 1. At 302, training data is received. The training data can be used to compensate for distortions of a desired wireless signal. In some embodiments, the training data can be used to estimate a wireless channel. For example, the training data includes TSC of a mobile communication burst. In some embodiments, receiving the training data includes detecting that an instance of the training data has been received. At 304, signal quality associated with the received training data is determined. In some embodiments, determining the signal quality includes determining a SIR (signal-to-interference ratio) of a received signal associated with the training data. In some embodiments, determining the signal quality includes determining a SNR (signal-to-noise ratio) of a received signal associated with the training data. In various embodiments, determining the signal quality includes analyzing a received signal to determine how likely a successful equalizer tap parameter can be determined using an estimation based at least in part on the received training data.

At 306, if is determined the a signal quality criterion is satisfied, at 308 equalizer tap is allowed to be updated based at least in part on the received training data. In some embodiments, determining whether the signal quality satisfies the criterion includes comparing the determined signal quality of 304 with a predetermined threshold. For example, if the determined signal quality meets a predetermined threshold, a the equalizer tap is allowed to be updated using a tap parameter/value/coefficient determined based at least in part on the received training data. In some embodiments, the equalizer tap update of 308 is associated with amplitude and/or delay correction. In some embodiments, the equalizer tap update of 308 is not associated with phase correction.

At 306, if is not determined the a signal quality criterion is satisfied, at 310 the equalizertap is not allowed to be updated based at least in part on the received training data. In some embodiments, not allowing the equalizer tap update includes using a previous updated equalizer tap. For example, a previously determined tap parameter is used to equalize a newly received wireless communication burst and a training data included in the newly received burst is not used to update the equalizer tap. In some embodiments, at 310, a received signal is corrected for phase based at least in part on the received training data even though amplitude and delay correction of the signal is not performed based on the received training data. In various embodiments, the process of FIG. 3 is repeated when an instance of a training data is received/detected. In some embodiments, if the determined signal quality has not met a predetermined threshold for a predetermined number of instances, an indication is generated, and/or the equalizer tap is allowed to be updated based at least in part on the TSC. The number of instances is associated with a time value and/or the number of times a training data has been determined/detected.

Figure 4:
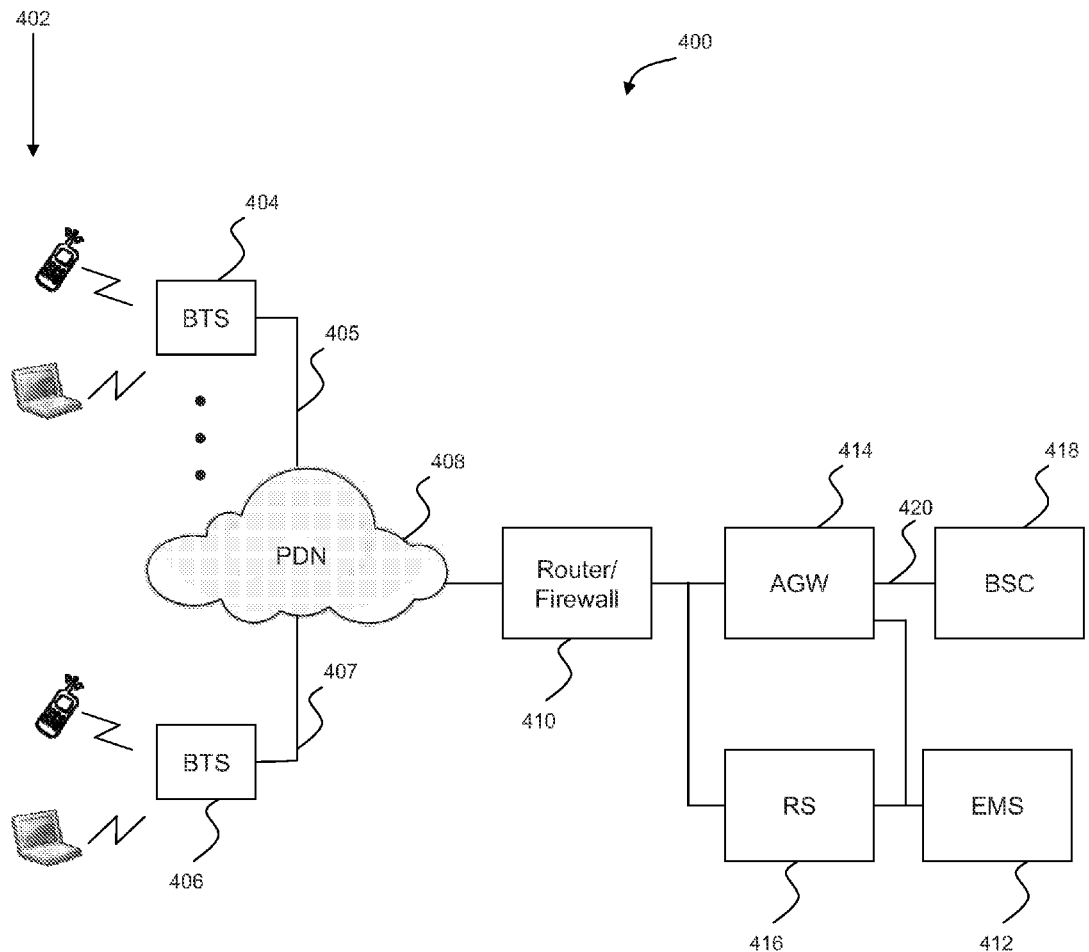
FIG. 4 is a block diagram illustrating an embodiment of a mobile network with packet data network backhaul.

FIG. 4 is a block diagram illustrating an embodiment of a mobile network with packet data network backhaul. In the example shown, the mobile network 400 includes mobile equipment 402 connected to a plurality of base transceiver stations represented in FIG. 4 by BTS 404 and BTS 406. In some embodiments, the system of FIG. 1 is included BTS 404 and/or BTS 406. BTS 404 and BTS 406 are connected via a local Internet access connection 405 and 407, respectively, to a packet data network (PDN) 408, such as the Internet. In some embodiments, mobile network data is sent, via PDN 408, between the base transceiver stations represented by BTS 404 and BTS 406, on the one hand, and an aggregation gateway (AGW) 414, on the other, using the Internet (IP) protocol. In various embodiments, Internet access connections 405 and 407 comprise a cable, DSL, or other modem collocated with the BTS and/or a local exchange carrier central office (LEC-CO) with DSLAM or cable head-end. Also connected to PDN 408 in the example shown in FIG. 4 is a router/firewall 410 connected to and configured to provide connectivity to and security with respect to an aggregation gateway 414, and a registration server 416. In some embodiments, element management server EMS 412 is connected to router/firewall 410. In some embodiments, router/firewall 410 is omitted and/or does not include a firewall. In various embodiments, element management server 412, aggregation gateway 414, and a registration server 416 are included in one or more physical computing systems. Element management server 412 enables an administrator to perform operational, administrative, and/or management (OAM) operations with respect to one or more mobile network elements, e.g., BTS 404 or BTS 406. Aggregation gateway (AGW) 414 receives inbound mobile network data (voice, signaling, data, control/management) from one or more base transceiver stations (BTS), via PDN 408, aggregates data from two or more base transceiver stations (if/as applicable), and provides the inbound data to BSC 418 via one or more physical ports, using time division multiplex (TDM) as prescribed by the GSM standard and the BSC OEM's proprietary implementation of the Abis interface 420. In some embodiments, the AGW 414 is capable of interfacing with more than one type of BSC, e.g., with BSC's from two or more vendors. In some such embodiments, the AGW 414 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate.

Registration server 416 is configured to be used to register a BTS and/or other provider equipment with the network, e.g., to authenticate the equipment prior to providing to the equipment session keys to be used in secure communication protocols, identifying (e.g., address) information for other network elements, such as AGW 414, etc.

In some embodiments AGW 414 aggregates data associated with multiple base transceiver stations and provides communication to/from the BSC via a fewer number of physical BSC ports (e.g., a single port). In various embodiments, use of PDN 408 and AGW 414 to transport data between base transceiver stations such as BTS 404 and BTS 406, on the one hand, and BSC 418, on the other, makes it commercially feasible to provide a small from factor and/or relatively low capacity BTS to provide dedicated service to individuals and/or relatively small groups of users, such as a household or small business, since in addition to not requiring a BSC port for each BTS a dedicated T-1/E-1 line is not required. Such indoor (e.g., home/office) environments are likely to exhibit long lasting fades such as described above, e.g., due to interference from obstacles such as file cabinets and other furniture, and the techniques described herein, while limited to the indoor environment, are likely useful in such an environment since the mobile station (MS) user likely will be moving, if at all, only on foot and therefore not very quickly relative to the position of the small form factor base station, such that it is less likely that the user's experience of call quality will be affected by omitting to update the equalizer taps during periods in which the signal-to-noise and/or other quality criteria is/are not met.

While the example shown in FIG. 4 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a received signal in a wireless communication device, comprising:
   determining that a received signal does not satisfy a prescribed signal quality criterion;
   using the received signal in a channel estimator to provide a phase correction signal to a phase corrector and to provide a channel estimate signal to an equalizer tap of an equalizer, wherein whether the channel estimate signal reaches the equalizer tap is based, at least in part, on the determination;
   using the phase correction signal from the channel estimator to correct a phase of the received signal in a phase corrector before sending the phase-corrected receive signal to the equalizer; and
   not updating an equalizer tap based, at least in part, on the determination.

2. The method according to claim 1, wherein the equalizer tap is included in an equalizer that utilizes channel estimation.

3. The method according to claim 1, wherein determining that the received signal does not satisfy the prescribed signal quality criterion includes determining a quality value indicating a quality of the received signal.

4. The method according to claim 3, wherein determining that the received signal does not satisfy the prescribed signal quality criterion includes determining that the quality value is less than a prescribed value.

5. The method according to claim 3, wherein the quality value includes one or more of the following: a signal-to-interference ratio and a signal-to-noise ratio.

6. The method according to claim 1, wherein determining that the received signal does not satisfy the prescribed signal quality criterion includes determining that a reliable wireless channel estimation of the received signal cannot be determined.

7. The method according to claim 1, wherein if the received signal does satisfy the prescribed signal quality criterion, the equalizer tap is updated based on the received signal.

8. The method according to claim 7, wherein updating the equalizer tap includes adjusting one or more of the following: a value of the tap, a coefficient of the tap, a formula associated with the tap, and a logic associated with the tap.

9. The method according to claim 1, wherein the received signal does not satisfy a prescribed signal quality due to one or more of the following: an inter-symbol interference, a multi-path effect, a co-channel noise, and an adjacent channel noise.

10. The method according to claim 1, wherein the phase of received signal is corrected base at least in part on information included in the received signal.

11. The method according to claim 1, wherein the equalizer tap is not associated with signal phase correction.

12. The method according to claim 1, wherein the equalizer tap is associated with one or more of the following: amplitude correction and delay correction.

13. The method according to claim 1, wherein the received signal is received via an antenna of a wireless receiver, and the wireless receiver is included in a Base Transceiver Station in communication with a mobile service provider equipment via a public packet data network.

14. The method according to claim 1, wherein determining that the received signal does not satisfy the prescribed signal quality criterion includes identifying data included in the received signal that can be used to determine an update of the tap.

15. The method according to claim 14, wherein the identified data includes Training Sequence Code of a mobile communication burst.

16. The method according to claim 14, wherein determining that the received signal does not satisfy the prescribed signal quality criterion includes determining a signal-to-interference ratio of the identified data.

17. The method according to claim 1, wherein determining that the received signal does not satisfy the prescribed signal quality criterion includes comparing a training sequence included in the received signal with a known training sequence to estimate a wireless channel of the received signal.

18. The method according to claim 1, wherein the equalizer tap is one of a plurality of taps not updated based at least in part on the determination.

19. The method according to claim 1, wherein not updating the equalizer tap based on the received signal includes using a previously determined parameter of the equalizer tap to equalize the received signal even though a training data included in the received signal can be used to update the equalizer tap.

20. The method according to claim 1, wherein the equalizer tap is an equalizer tap of one of the following: a Decision Feedback Equalizer (DFE), a Maximum Likelihood Sequence Estimator (MLSE) Equalizer, a Delayed Decision Feedback Sequence Estimator (DDFSE) Equalizer, and a Reduced State Sequence Estimator (RSSE) Equalizer.

21. The method according to claim 1, wherein if the prescribed signal quality criterion has not been satisfied for a prescribed number of times, the equalizer tap is allowed to be updated based on the received signal.

22. The method according to claim 1, wherein whether the equalizer tap is updated or not is independent of an output of the equalizer.

23. A system for processing a received signal, comprising:
a logic component configured to determine that a received signal does not satisfy a prescribed signal quality criterion;
a phase corrector that receives the received signal and is coupled to an equalizer;
a channel estimator that also receives the received signal and outputs a phase correction signal to the phase corrector and a channel estimate signal to an equalizer tap of the equalizer, wherein whether the channel estimate signal reaches the equalizer tap is based, at least in part, on the determination of the logic component; and
the equalizer including the equalizer tap is not updated based, at least in part, on the determination of the logic component,
wherein the phase corrector corrects a phase of the received signal before sending the phase-corrected receive signal to the equalizer.

24. The system according to claim 23, wherein the logic component determines that the received signal does not satisfy the prescribed signal quality criterion including by determining a quality value indicating a quality of the received signal.

25. The system according to claim 24, wherein the quality value includes one or more of the following: a signal-to-interference ratio and a signal to noise ratio.

26. The system according to claim 23, wherein the equalizer is not associated with signal phase correction.

27. A system as recited in claim 23, wherein a phase of the received signal is corrected based at least in part on data used to determine the prescribed signal quality criterion.

28. The system according to claim 23, wherein the received signal is received via an antenna of a wireless receiver, and the wireless receiver is included in a Base Transceiver Station in communication with a mobile service provider equipment via a public packet data network.

29. The system according to claim 23, wherein whether the equalizer tap is updated or not is independent of an output of the equalizer.

30. A computer program product for processing a received signal in a wireless communication device, the computer program product being embodied in a computer readable medium and comprising computer instructions for:
determining that a received signal does not satisfy a prescribed signal quality criterion;
using the received signal to provide a phase correction signal and to provide a channel estimate signal to an equalizer tap of an equalizer, wherein whether the channel estimate signal reaches the equalizer tap is based, at least in part, on the determination;
using the phase correction signal to correct a phase of the received signal before sending the phase-corrected receive signal to the equalizer; and
not updating an equalizer tap based, at least in part, on the determination.

31. The computer program product according to claim 30, wherein determining that the received signal does not satisfy the prescribed signal quality criterion includes determining a quality value indicating a quality of a received signal.

32. The computer program product according to claim 30, wherein determining that the received signal does not satisfy the prescribed signal quality criterion includes determining that a reliable wireless channel estimation of the received signal cannot be determined.

33. The computer program product according to claim 30, wherein the equalizer tap is not associated with signal phase correction.

34. The computer program product according to claim 30, wherein whether the equalizer tap is updated or not is independent of an output of the equalizer.

* * * * *

UNITED STATES PATENT AND TRADEMARK OFFICE
CERTIFICATE OF CORRECTION

| | | |
|---|---|---|
| PATENT NO. | : 7,852,914 B2 | Page 1 of 1 |
| APPLICATION NO. | : 11/643738 | |
| DATED | : December 14, 2010 | |
| INVENTOR(S) | : Patton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this
Thirty-first Day of May, 2011

David J. Kappos
*Director of the United States Patent and Trademark Office*